United States Patent [19]

Hawthorne et al.

[11] Patent Number: 5,524,551
[45] Date of Patent: Jun. 11, 1996

[54] SPRING-PACK ASSEMBLY FOR A RAILWAY TRUCK BOLSTER ASSEMBLY

[75] Inventors: V. Terrey Hawthorne, Lisle; David J. Goding, Palos Park, both of Ill.

[73] Assignee: Amsted Industries Incorporated, Chicago, Ill.

[21] Appl. No.: 294,559

[22] Filed: Aug. 23, 1994

[51] Int. Cl.$^6$ ............................................. B61F 5/00
[52] U.S. Cl. ........................................ 105/198.4; 105/198.5
[58] Field of Search ........................... 105/197.05, 198.4, 105/198.2, 197.2, 198.5

[56] References Cited

U.S. PATENT DOCUMENTS

| | | | |
|---|---|---|---|
| 119,254 | 9/1871 | Vose . | |
| 190,582 | 5/1877 | Hansell . | |
| 531,910 | 1/1895 | Cloud . | |
| 1,095,641 | 5/1914 | Johnson . | |
| 1,124,746 | 1/1915 | Kadel . | |
| 1,930,630 | 10/1933 | Symington | 267/4 |
| 1,934,579 | 11/1933 | Wine | 267/4 |
| 1,973,663 | 9/1934 | Shafer | 105/197 |
| 2,338,988 | 1/1944 | Webb | 105/197.05 |
| 2,354,458 | 7/1944 | Hammerstrom | 267/4 |
| 2,386,895 | 10/1945 | Haseltine | 267/9 |
| 2,675,765 | 4/1954 | Hamilton | 105/197 |
| 2,873,691 | 2/1959 | Guins | 105/197 |
| 3,545,385 | 12/1970 | Newmann | 105/198.4 |
| 3,575,117 | 4/1971 | Tack | 105/198.4 |
| 3,756,162 | 9/1973 | Wulff | 105/197 D |
| 3,762,694 | 10/1973 | MacDonnell | 267/3 |
| 3,799,067 | 3/1974 | Newman et al. | 105/198.4 |
| 3,845,725 | 11/1974 | Gierlach | 105/197 DB |
| 3,851,595 | 12/1974 | Clasen | 105/198.4 |
| 3,977,332 | 8/1976 | Bullock | 105/197 DB |
| 4,030,424 | 6/1977 | Garner et al. | 105/182 R |
| 4,148,469 | 4/1979 | Geyer | 267/4 |
| 4,186,914 | 2/1980 | Radwill et al. | 267/4 |
| 4,230,047 | 10/1980 | Wiebe | 105/197 D |
| 4,295,429 | 10/1981 | Wiebe | 105/198.4 |
| 4,333,403 | 6/1982 | Tack et al. | 105/197.05 |
| 4,765,251 | 8/1988 | Guins | 105/197.05 |
| 4,986,192 | 1/1991 | Wiebe | 105/198.4 |
| 5,039,071 | 8/1991 | Irle et al. | 267/52 |

OTHER PUBLICATIONS

"A Light–Weight, Improved Performance Truck for the Trinity H–Pit Car", V. T. Hawthorne and S. W. Smith. Jul. 1993.
"Car and Locomotive Encylopedia". 1974 Centennial Edition, pp. S–13–24, S–13–53, and S–13–56.
"The Four Faces of Ride Control Trucks", American Steel Foundries (no date).
"From the Extended Life Spring People" (ASF (no date).
"The Super Service Ride Control Truck" (no date).
"Mark's Mechanical Engineering Handbook, Ninth Edition", pp. 11–43 and 11–44 including FIGS. 11.2.4 and 11.2.26 (no date).

Primary Examiner—Mark T. Le
Attorney, Agent, or Firm—Edward J. Brosius; F. S. Gregorczyk

[57] ABSTRACT

A variable spring group for a railcar wheel truck assembly, which spring group has independent variable rate control springs for biasing snubber assemblies of a bolster in the wheel truck assembly, with the spring group having a first linear spring rate at an empty-railcar condition and a second linear spring rate at a loaded railcar condition that is at least five times as great as the empty-car spring rate, and the control springs are variable rate springs with a first and empty-railcar rate and a second and loaded-railcar spring rate, which is about twice the empty car control spring rate.

15 Claims, 6 Drawing Sheets

SPRING-PACK ASSEMBLY FOR A RAILWAY TRUCK BOLSTER ASSEMBLY

BACKGROUND OF THE INVENTION

In the railway rolling stock art, it is common practice to support the opposed ends of a freight railcar body on spaced-apart wheel-truck assemblies for travel along a railway track. A standard railcar wheel-truck assembly generally has a laterally spaced pair of sideframes which are longitudinally operable along the tracks and parallel to the longitudinal axis of the railcar. A bolster, which is transversely positioned to the longitudinal direction of the railcar, couples the sideframes and has the freight car body supported on bolster center plate sections. A railcar wheel-truck, or truck is positioned at the opposed ends of the railcar to support it during its traversal of the rail tracks.

Each sideframe includes a window portion for the bolster ends and the spring groups supporting the bolster, which structure allows bolster movement relative to the sideframe. Each spring group typically includes a plurality of coil springs extending between a sideframe spring seat portion and an undersurface of the bolster end spaced above the respective sideframe spring-seat. Elastomeric spring type products may also be utilized in a spring group as an alternative to the coil springs.

Railway track conditions can include rail running surface variations or discontinuities from differential settling of track on its ballast, rail wear, corrugations, rail misalignment, worn switch frogs or misaligned switch points, as well as the intersection of rails for flange clearance, switches where switching points match with running rails, and rail joints. During normal railcar usage or operation, these and other variations can result in wheel-truck oscillations, which may induce the railcar body to bounce, sway, rock or engage in other unacceptable motions. Wheel-truck movements transferred through the suspension system may reinforce and amplify the uncontrolled motions of the railcar from track variations, which action may result in wheel-truck unloading, and a wheel or wheels of the truck may lift from the track.

The American Association of Railroads, the AAR, establishes the criteria for railcar stability, wheel loading and spring group structure, which criteria are very severe. These criteria are set or defined in recognition that railcar body dynamic modes of vibration, such as rocking of sufficient magnitude, may compress individual springs of the spring group at alternate ends of the bolster, even to a solid or near-solid condition. This alternate-end spring compression is followed by an expansion of the springs, which action-reaction can amplify and exaggerate the 'apparent' wheel loading on the suspension system and subsequent rocking motion of the railcar, as opposed to the actual or "average" weight or load from the railcar and freight therein. As a consequence of the amplified rocking motion, and at large amplitudes of such rocking motion, the contact force between the rails and the wheels can be dramatically reduced on the alternate lateral sides of the railcar. In an extreme case, the wheels can elevate and disalign from the track, which enhances the opportunity for a derailment. At a no-load condition of a railcar, one standard considers or uses the rail wheel just contacting the rail as a reference condition.

There are various modes of motion of a railcar body, that is bounce, pitch, yaw, and lateral oscillation, as well as the above-noted roll. In car body roll, or twist and roll as defined by the AAR, the car body appears to be alternately rotating in the direction of either lateral side and about a longitudinal axis of the railcar. Car body pitch can be considered a forward to rearward rotational motion about a transverse railcar axis of rotation, such that the railcar may appear to be lunging between its forward and reverse longitudinal directions. The above-noted car body bounce refers to a vertical and linear motion of the railcar. Yaw is considered a rotational motion about a vertical axis extending through the railcar, which gives the appearance of the car ends moving to and fro as the railcar moves down a track. Finally, lateral stability is considered an oscillating lateral translation of the car body. Alternatively, truck hunting refers to a parallelogramming or warping of the railcar truck, not the railcar body, which is a separate phenomena distinct from the railcar body motions noted above. All of these motion modes are undesirable and can lead to unacceptable railcar performance, as well as contributing to unsafe operation of the railcar.

A common apparatus utilized to control the dynamic responses of railcar trucks and bodies is a friction shoe assembly, which provides bolster-to-sideframe damping of oscillating motion. Friction shoes include a friction wedge in a bolster pocket, which wedge is biased to maintain frictional engagement with the sideframe. Friction shoes dissipate suspension system energy by frictionally damping relative motion between the bolster and sideframe. Various types of friction shoes have been utilized in railway freight car trucks for over forty years.

The structure, the profiles and related elements of the friction shoe have changed since their introduction, which changes included the implementation of elastomeric friction elements on bearing faces or wings of the friction shoes. Winged friction shoes are most generally utilized with constant or fixed bias frictional damping structures with the friction shoe wings contacting complementary inner surfaces of the bolster pockets. A retention or control spring, which biases the friction shoe and maintains it against the bolster pocket surface and the sideframe column wear surface, is supported by the spring base or seat portion of the sideframe beneath the friction shoe. With a fixed or constant bias or damping spring group the control springs do not carry load and, the compression rate of the friction shoe assembly spring, that is the spring displacement as a function of the force, remains essentially unchanged during relative movement between the bolster and sideframe. Thus, in a constant bias arrangement, the biasing force applied to the friction shoe remains constant throughout the operating ranges for both the relative motion and biasing spring displacement between the bolster and sideframes for all conditions of railcar loading. Consequently, the frictional force between the friction shoe and column wear surfaces remains relatively constant.

Alternatively, the frictional response of friction shoes in variable bias arrangements varies with variations in the compression distance of the retention spring. Therefore, the frictional force between the friction shoe and the sideframe column varies with the vertical movement of the bolster. However, in a variable rate spring structure the operating range, or the spring rate, of the control spring may not be adequate to respond to the applied forces, that is the railcar weight and the oscillating dynamic forces, from variations in the track and operating conditions. In at least some variable friction force arrangements, the distance between the friction shoe and the sideframe spring seat has been considered to be adequate to accommodate a friction-shoe biasing spring with a suitable design characteristic to handle the force variations and ranges in the railcar wheel-truck assembly, even for railcars with a higher-rated, load-bearing capacity.

In fixed or constant biasing arrangements, the friction shoe frequently has a spring pocket to receive a control spring having adequate length and coil diameter to provide the requisite frictional damping. In some literature, it has been noted that this damping is particularly designed to accommodate the empty or lightly loaded car condition, but its response at the fully-laden car condition is not considered adequate. Alternatively, a constant-bias spring group adequate for operation at the fully-laden car condition may not provide the requisite damping and suspension response at the empty-car condition.

Illustrative of a problem encountered in railcar-track interactions is the superelevated curve, which is a relatively steeply sloped track section, that is similar to the steeply sloped curves of racetracks or sharply curved roads, to promote high speed travel through a curve. As a railcar enters a superelevated curve, the inside entry wheel will lift or "unload" relative to the outside wheel, although it will not necessarily lift off the track. However, this same wheel will 'drop' back down to the rail and the reference plane of the track, relative to the outside wheel, as the railcar leaves the superelevated curve. There are apparent conflicts and contradictions among the desired operating characteristics for railcars which depend upon the state of the railcar weight between empty and fully laden. The variation in the railcar weights impacts upon the desired spring rates. Further, these railcar variations have been compounded by the expanding differential between the decreasing tare weight of the empty railcar and the increasing rated-carrying-capacity of the newer-designed railcars.

The spring group arrangements support the railcar and damp the relative interaction between the bolster and sideframe. There have been numerous types of spring groups utilized for railcar suspension systems, such as concentric springs within the spring group; five, seven and nine spring arrangements; elongated springs for the friction shoe; and, short spring-long spring combinations for the friction shoe within the multispring set. These are just a few of the many noted spring arrangements that have been positioned between sideframe and bolster end assemblies. These spring assemblies must conform to standards set by the Association of American Railroads (AAR), which prescribes a fixed spring height for each coil spring at the fully-compressed or solid spring condition. The particular spring arrangement for any railcar is dependent upon the physical structure of the railcar, its rated weight-carrying capacity and the structure of the wheel-truck assembly. That is, the spring group arrangement must be responsive to variations in the railcar such as the empty railcar weight, the laden-to-capacity railcar weight, railcar weight distribution, railcar operating characteristics, available vertical space between the sideframe spring-platform and the bolster end, the specific friction shoe design and, other operating and physical parameters.

The following table illustrates the change in 100-ton railcar empty weights and lading capacities for several periods to for both the gross rail load and the railcar weight, which car and lading capacity weights for some periods are overlapping:

| TIME PERIOD (years) (approximate) | TARE WEIGHT OF LIGHT WEIGHT CARS (pounds) |
|---|---|
| 1950's | 68,000 |
| 1970's | 63,000 |
| 1980's | 52,000 |
| 1990's | 44,000 |
| design goal | 40,000 |

| TIME PERIOD | GROSS RAIL LOAD (pounds) |
|---|---|
| 1950 TO 1975 | 242,000 |
| 1975 to 1990's | 263,000 |
| 1990's | 286,000 |
| under review | 297,000 |

The continuing divergence between the empty-railcar weight and the freight-load carrying capacity of the railcars produces changes in the railcar operating characteristics. That is, as the railcars become lighter to reduce the non-tariff railcar load or weight, there has been a continuing demand to increase the carrying capacity of the railcar to further enhance revenue-generation from each railcar. This has resulted in an increase in the difference between the tare weight and the capacity weight of the railcar. The operating characteristics of the railcar can be accommodated at either the empty-car weight or fully-loaded car weight extreme with only nominal adjustment of the suspension systems from the railcar designer. However, as the differential between the car weight and the car-lading capacity increases, it becomes progressively more difficult to provide a spring group and damping apparatus, which will fit the physical structural limitations of a railcar and be operable over a wide range of loads and broad variations in the railcar operating environment, such as rail track variations.

Currently many 100-ton railcars, and in fact, most new, coal railcars with a gross load capacity of 286,000 pounds and a tare weight of 43,000 pounds, are in service, and the rail industry has an ultimate goal of providing a railcar tare weight of less than 40,000 pounds with at least this rated carrying capacity. The railcar must be physically able to bear the rated load weight and maintain contact with the track as the car travels at varying speeds along different track contours with varying track conditions. Simultaneously, the railcar and truck assemblies must have operating characteristics enabling it to be safely operable on these same varying track conditions at the unloaded, empty-car condition. Both operating weight extremes must be accommodated without posing the danger of imminent derailment for either condition.

To provide a railcar with the above-required operating range capabilities, the damping system spring group incorporated into the truck assembly must have both static and dynamic operating characteristics to accommodate these wide laden-to-empty weight ranges. That is, operation of a large, empty-volume freight car in motion on a railtrack with a wide variant of track and contour conditions can lead to dynamic operating problems from oscillations, which can progress to uncontrolled instabilities of the railcar especially in superelevated curves. Track-to-wheel separation is a result of several conditions, including traversal of rail imperfections, and in conjunction with the oscillation frequency of the car from traversing the disuniform tracks, disengagement of a wheel of an unloaded railcar is not an unusual condition. Although wheel disengagement from the track does not generally result in a derailment, the implied hazard from such a separation is readily apparent and should be avoided, if possible.

Freight railcars are continuously becoming significantly lighter than previously utilized freight railcars, that is an empty or unloaded railcar weight less than 44000 pounds versus earlier freight railcars of 63000 pounds. This change in weight induces changes in railcar-tracking on superelevated curves, railcar instability, body rocking, truck squaring, and other problems associated with railcar usage at both an empty and fully laden state. These variations or instabilities in railcar operating characteristics are known to lead to operational problems, including derailments at an extreme condition. The problem for any railcar builder, and the suppliers of freight railcar truck assemblies, is to match the design of the truck assembly to the physical parameters of the freight railcar to enhance its safe operation.

One of the primary methods for dealing with the oscillations of a railcar and truck assembly is the damping from the above-noted friction shoe, as well as the stabilizing effect of the supporting springs. These oscillations may be due in part to the physical track conditions experienced by freight cars during their operation. Variations in track conditions can effect operation of the truck assembly, which track variation effects may be amplified as they are transferred through the wheel, axle and suspension to the frame. This may effect operation of the railcar as it traverses the track and encounters more of these track-induced operating problems.

The spring rates for the dynamic or moving car condition are graphically illustrable as generally having a range of spring deflections, that is expansions or compressions, centered about the static compressed height of the spring for both the empty-car weight and the laden-to-capacity railcar weight. The spring rate for each spring of a two-spring combination is linear over its individual range, but considered as a unit the springs may represent a variable rate spring. A variable rate spring arrangement is required to provide the broad spring-rate operating range necessary for railcar stability at a car-empty state for light weight railcars now contemplated for use by the railroads; and, also to provide the requisite suspension and damping to the fully-laden railcar at a greater weight than the present rated-standard capacity.

SUMMARY OF THE INVENTION

The present invention provides a spring group with load springs, control springs, and a frictional damping arrangement for a railcar truck assembly. More specifically, this damping and suspension arrangement provides damping for lightweight, high-capacity freight railcars at both the empty railcar and fully-laden railcar conditions; and, it has dynamic operating capabilities to accommodate dynamic railcar spring compression variations about a static operating point.

The spring group and damping arrangement of the present invention has a dual-rate, control spring for each friction shoe as well as a number of dual-rate, load springs, as required for each individual style of railcar, which arrangement provides the greatest support for the railcar. The control springs operate with the load springs and contribute to the total spring or load-bearing capacity of the spring group, but the control springs usually have a significantly lower load-bearing capacity or compressibility than the load springs of a typical railcar spring set. The spring group operation and design are most easily explained and understood through the utilization of a graphical illustration, which depicts in a more understandable fashion the physical parameters and characteristics of a spring not visually apparent to an observer. In a graphical depiction, the spring group has an approximately fixed or finite compression height at a static or idle state for an empty railcar. Further, there is a second or fully-laden railcar state with a fixed spring compression height for a loaded-to-capacity and idle railcar. The spring rates for the spring group are linear for each of the first and second rates of the dual-rate springs. The linearity for the first spring rate in the spring group is provided only over a first fixed range, and the linearity for the second rate is defined over a second fixed range. The second spring rate is generally greater than the first spring rate and may be limited at an upper load boundary by the fully-compressed or solid-spring condition.

In the present invention, the railcar suspension arrangement has a spring suspension with a damping assembly for a sideframe-bolster, wheel-truck assembly with a friction shoe for damping a new and lighter freight railcar, and general criteria are noted for constructing the damping assembly. This railcar suspension uses dual rate springs for both the control springs, that is friction-shoe bias springs, and for the load springs of the spring group. In the preferred embodiment, both the load springs and control variable rate springs, as well as the spring group as a whole, have a first linear rate for control of the railcar at the lighter weight, empty-car condition and, a second and greater linear rate at a loaded railcar condition. In the preferred embodiment of the spring group, there is a reserve in the spring system to account for perturbations, such as overloading, in excess of the dynamic range for the rated car capacity, and the resultant spring-coil compressions down to the fully compressed, solid-spring state. In dynamic operating motion, the control spring remains loaded. The solid-spring state and the various sizes of the springs are dependent upon AAR specifications and the space available in the various sideframe structures. The specific configuration of a spring group is also determined by the available space and the spring response sought by the railcar manufacturer to maintain railcar stability across the operating weight range.

BRIEF DESCRIPTION OF THE DRAWINGS

In the figures of the Drawings, like reference numerals identify like components and in the drawings:

FIG. 11A is the spring of FIG. 11 compressed to a height at an empty-car condition; and, FIG. 11B is the spring of FIG. 11 compressed to a height at a loaded-to-capacity condition.

DETAILED DESCRIPTION OF THE PREFERRED EMBODIMENT

Figure 1:
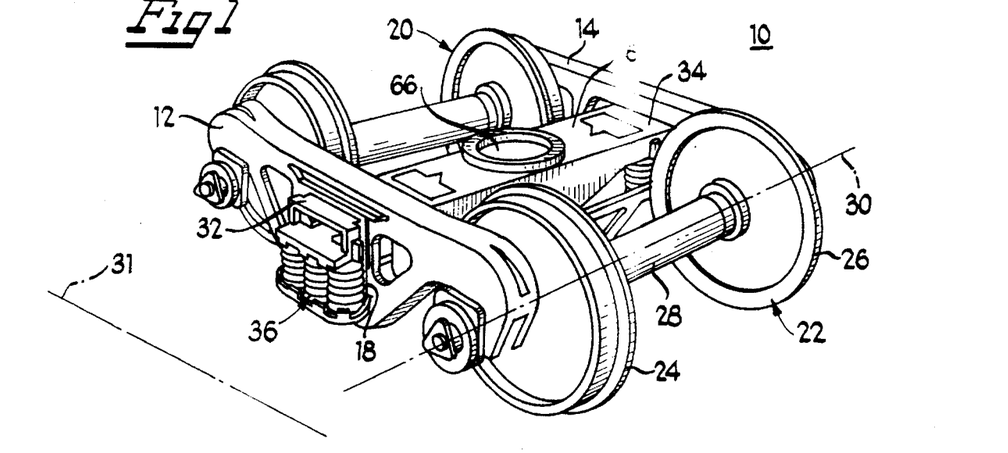
FIG. 1 is an oblique view of a railcar wheel truck assembly.

An exemplary railcar wheel truck assembly 10, as shown in FIG. 1, has a first sideframe 12 and a second sideframe 14, which are arranged in parallel alignment. Transverse bolster 16 couples first and second sideframes 12 and 14 generally at their respective spring windows 18, which are about at the longitudinal midpoint of first and second sideframes 12, 14. First axle and wheel set 20 and second axle and wheel set 22 are positioned at the opposed ends of aligned sideframes 12 and 14. Each of first and second axle and wheel set 20, 22 has an axle axis 30 generally transverse to the longitudinal axis 31 of first and second sideframes 12, 14 and about parallel to bolster 16. Each of first and second wheel sets 20, 22 include wheels 24 and 26 and axle 28 with axle axis 30.

Figure 2:
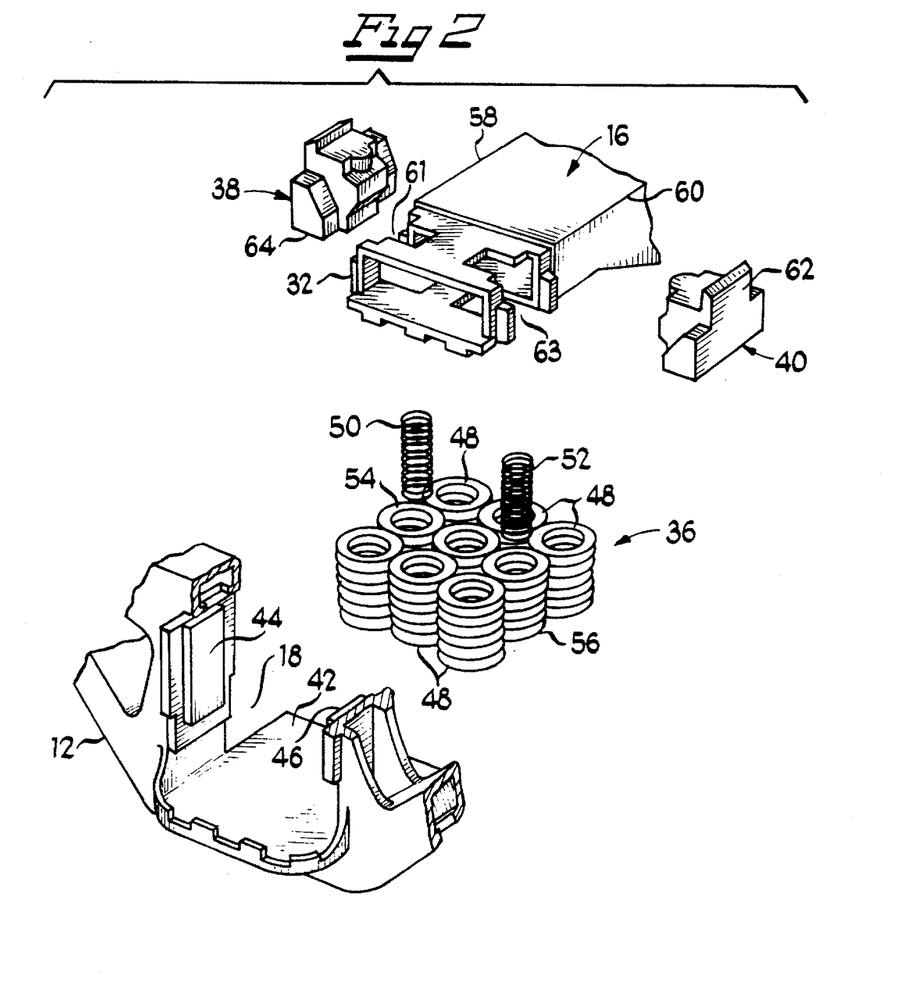
FIG. 2 is an exploded view in partial section of a sideframe, spring group, bolster end and friction shoes at one side of the wheel truck assembly of FIG. 1.

Bolster 16 has first end 32 and second end 34, which respectively extend through windows 18 of first and second sideframes 12 and 14 in FIG. 1. Window 18, bolster end 32, spring group 36, first friction shoe 38 and second friction shoe 40 of sideframe 12 are shown in FIG. 2 in an enlarged, partially sectioned and exploded view. As bolster ends 32 and 34, first and second sideframes 12 and 14, and sideframe windows 18 are structurally and functionally similar, only bolster end 32 at first sideframe 12 will be described, but the description is also applicable to bolster end 34 and window 18 of second sideframe 14.

In FIG. 2, sideframe window 18 has lower support platform 42 with first and second upright side columns or side faces 44 and 46, respectively, extending vertically from platform 42. Spring group 36 is shown as a three by three matrix of load springs 48, 54 and 56. In this matrix, first inner control spring 50 and second control spring 52 are concentrically positioned in outer control springs 54 and 56, respectively, to provide control spring subassemblies, which control springs 50, 52, 54 and 56 are also railcar load-bearing elements. Load springs 48, or load spring subassemblies may include 2 or 3 individual springs concentrically arranged in a manner to meet design criteria or to provide optimum dynamic performance of suspension spring group 36.

Figure 3:
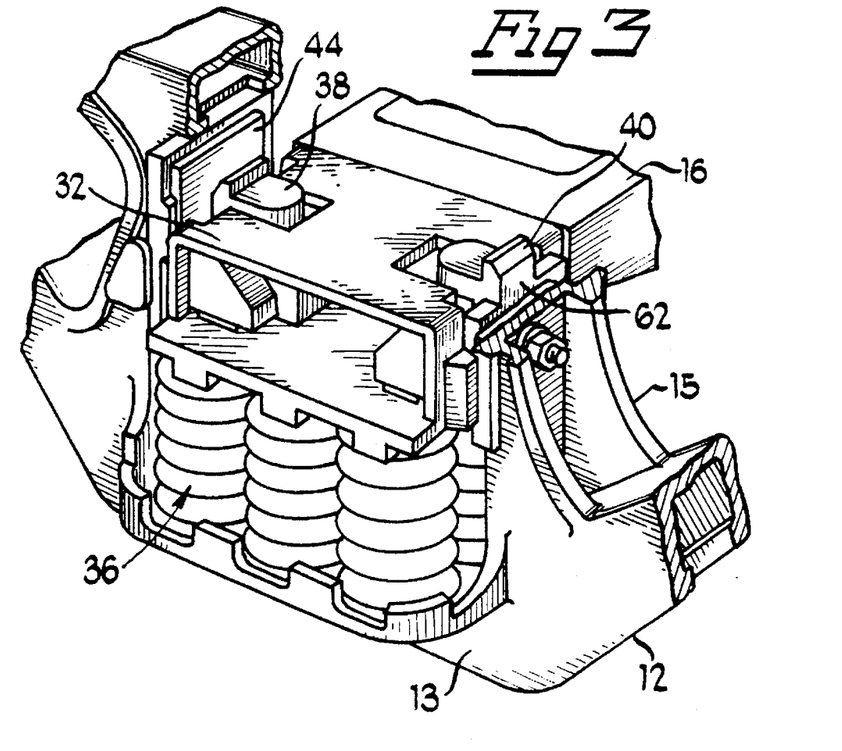
FIG. 3 is an oblique view of the assembled wheel truck assembly section illustrated in FIG. 2.
Figure 4:
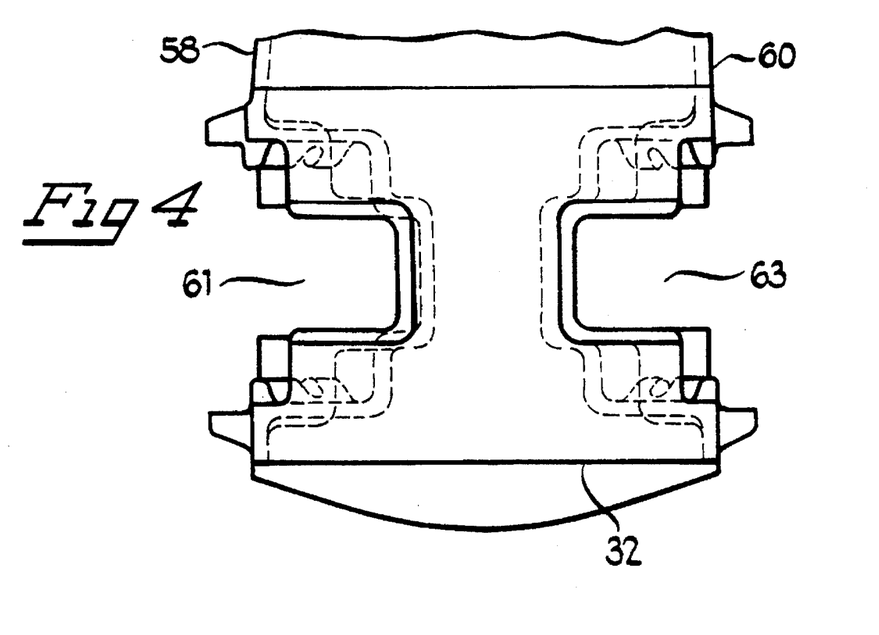
FIG. 4 is a plan view of a bolster end and its friction shoe pockets.
Figure 5:
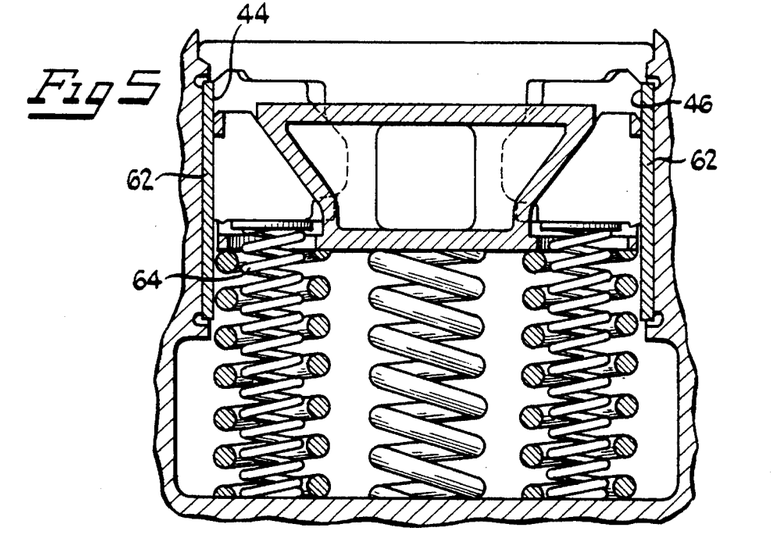
FIG. 5 is an elevational view in section of the spring group, bolster end and friction shoes.

Bolster end 32 in FIGS. 2 and 4 has forward friction shoe pocket 61 at bolster forward edge 58 and rear friction shoe pocket 63 at bolster rear edge 60, which friction shoe pockets 61 and 63 receive first and second friction shoes 38 and 40, respectively, for sliding operation therein. The several elements of sideframe 12, bolster 16 and spring group 36 of FIG. 2 are shown in the assembled form in FIG. 3. In this figure, the interface contact is noted between side column wear face 46 (cf., FIG. 2) and friction face 62 of friction shoe 40. A similar friction face 62 is also present on friction shoe 38 and other friction shoes of wheel trucks. It is the frictional interface action between a friction shoe and a wear face, such as friction shoe 40 and wear face 46, which provides the control force of the friction shoe. The biasing force applied to friction shoes 38, 40 is provided by control springs 50, 52, 54 and 56, at friction shoe lower surfaces 64, as noted in FIG. 5.

Figure 6:
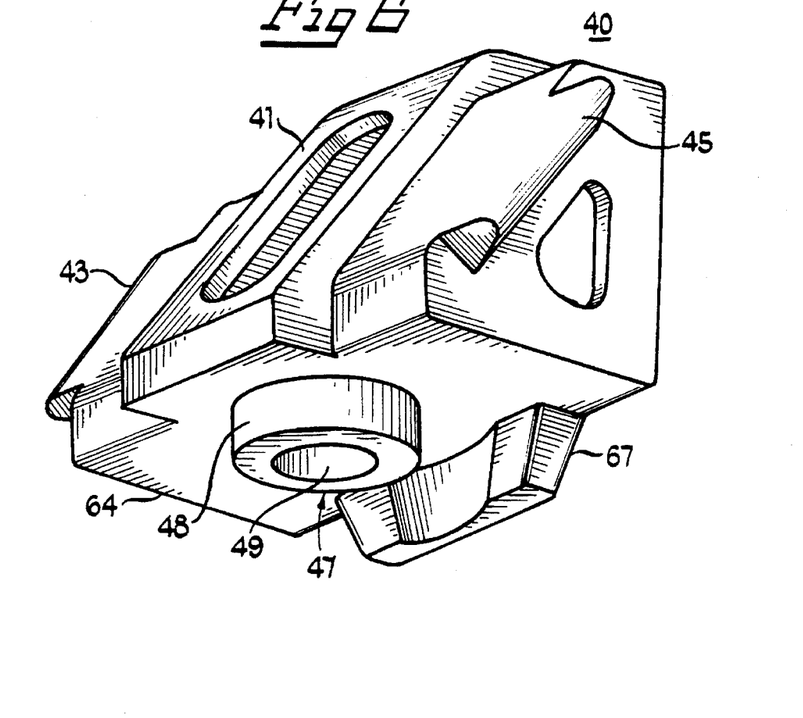
FIG. 6 is a lower elevational oblique view of a winged friction shoe.

Friction shoes 38, 40 operate as damping devices while sharing the load with the load springs 48. Friction shoe 40 in FIG. 6 is a winged friction shoe having central portion 41, first wing 43 and second wing 45. Friction shoe central portion 41 is slidably matable with slot 61 or 63 of bolster end 32, as shown in FIG. 4, to maintain friction shoe 40 in position and guide it during its vertical reciprocation as the railcar traverses the rail tracks. However, the biasing operation of control springs, subassemblies or couplets 50, 54 and 52, 56 provide a variable and dual-rate biasing action on their associated friction shoe 38, 40, which accommodates the dynamic operating range of the wheel-truck assembly 10 and freight car (not shown). In FIG. 6, friction shoe 40 has generally trapezoidal member 67 extending normally to lower surface 64 at friction face 62 to provide an extended wear face and to add stability to the operation of friction shoe 40. Annular disc or annulus 47, which is generally centrally positioned on lower surface 64, extends from lower surface 64 into control-coil spring 52 to maintain spring 52 in alignment. Spring 52 is in contact with lower shoe surface 64 and biases friction shoe 40 for damping of bolster 12, truck 10 and thus the railcar.

In normal operation of a freight railcar, spring group 36 biases bolster 16 and, thus, the freight railcar supported by bolster 16 at center plate 66. The biasing force controls or accommodates the oscillations or bouncing of the railcar, maintains railcar stability during traversal of the rail tracks and dampens any perturbations from various indeterminate influences, as noted above.

Figure 9:
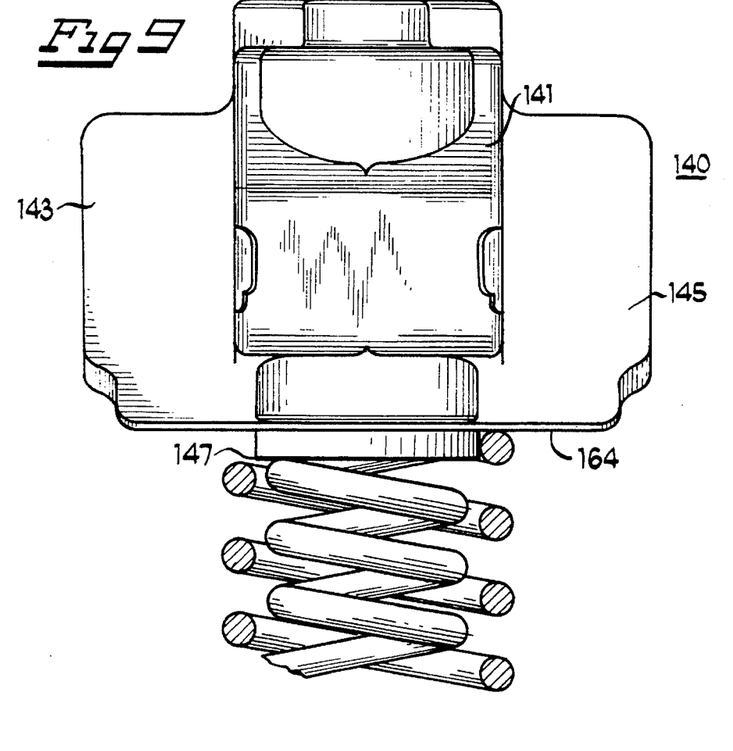
FIG. 9 is a front elevational view of an alternative embodiment of a winged friction shoe.
Figure 10:
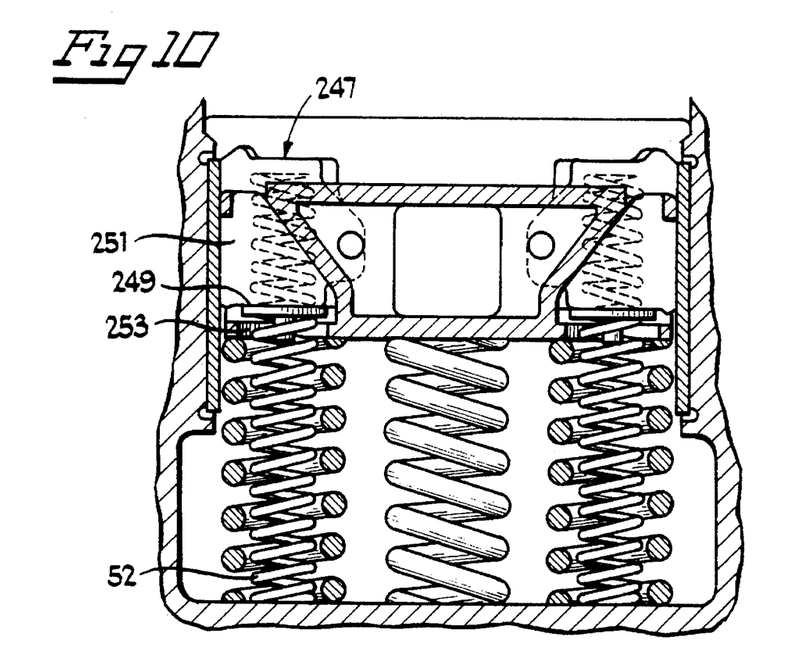
FIG. 10 is an elevational view of a spring group in a sideframe with the friction shoe of FIG. 9.

Alternative structures for the friction shoe and the spring group are noted in FIGS. 9 and 10. In FIG. 9, friction shoe 140 is a double-wing structure with central portion 141, first wing 143, second wing 145 and lower surface 164. Protuberance 147 is mounted and generally centered on lower face 164, which protuberance 147 extends into a control spring end to maintain spring 52 in alignment against lower surface 164 to bias friction shoe 140.

In FIG. 10, second alternative friction shoe 247 is noted in an illustrative segment of a sideframe and bolster. In this structure, friction shoe 247 has lower port 249 open to internal chamber 251 of shoe 247. Control spring 52 extends into chamber 251 to bias shoe 247 against boslter 36. In this structure, friction shoe 247 may have any form, such as double-winged or single-sloped face. Further, it is noted that bolster 36 has a through-bore 253 to permit passage of control spring 52.

The damping action is frequently applied through apparatus, such as friction shoes 38 and 40, operable at the opposed bolster ends 32, 34 and at each forward and rear edge 58, 60. However, it is not simply the application of a biasing force to bolster end 32, 34 and friction shoes 38, 40, but the application of the static load (compressive force on the spring), that is the railcar weight at either an unloaded or fully laden weight. However for any particular railcar, the railcar weight is a variable with a broad range extending from an empty-car, vehicle tare weight to a loaded-to-capacity railcar, and perhaps loaded above the rated, vehicle weight. As the railcar traverses the track it experiences dynamic compressive forces on the springs, and it is susceptible to all the above-cited track flaws as well as countless others, which could contribute to undamped oscillations. Spring group 36 and friction shoes 38, 40 provide the requisite damping to the railcar and wheel-truck assembly 10 for its safe operation.

A particularly strenuous and often encountered rail track condition is the earlier noted superelevated curve, which track curve is designed to ease the travel of railcars through curves and enhance their safe operation. However, though the superelevated curves partially alleviate some railcar operational problems, other significant operational problems for railcar operation remain or are created as a result of operating through these curves. In fact, some extant railcar operational problems in these curves may be magnified or amplified for the lighter tare weight cars, especially at the empty-car state.

Figure 7:
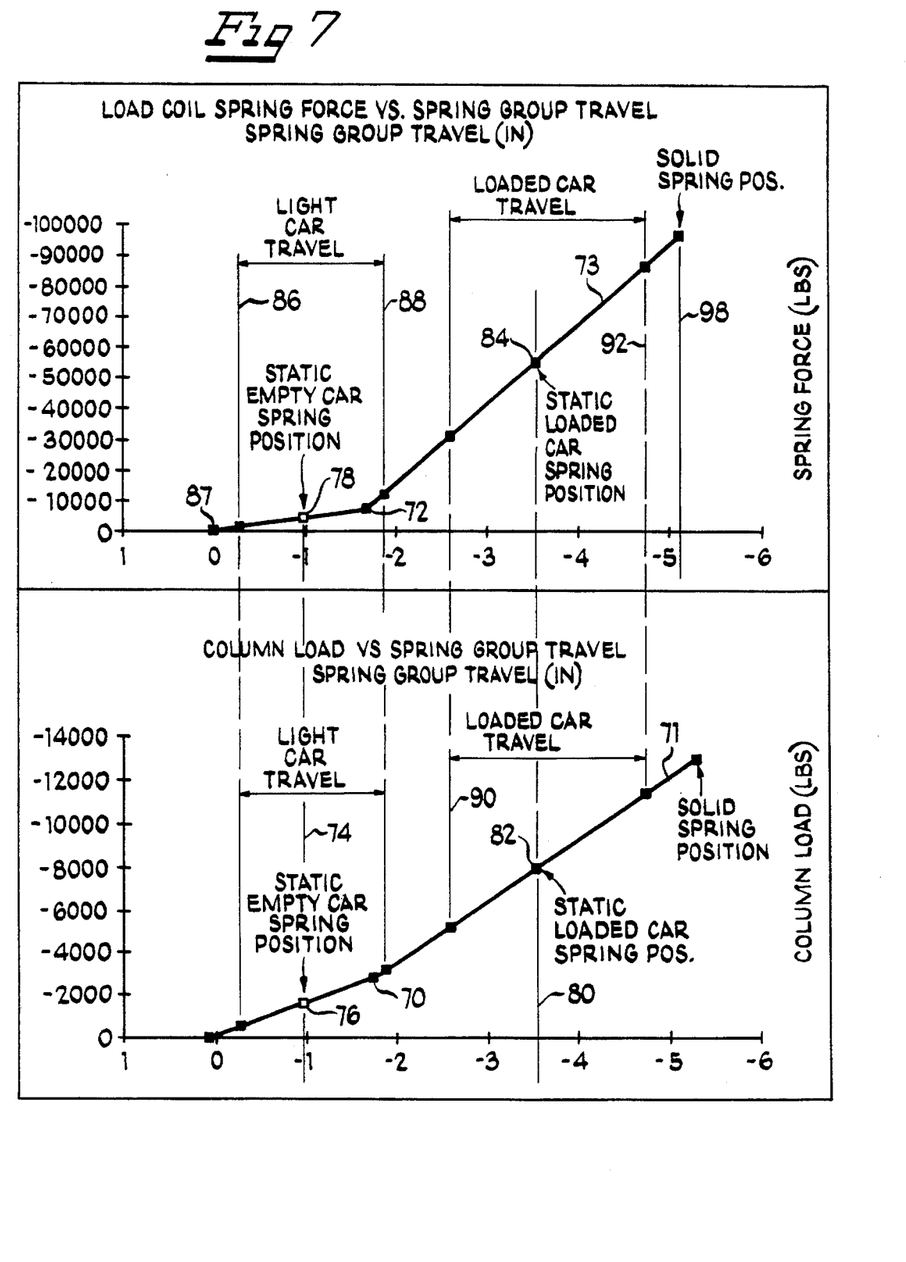
FIG. 7 is a dual graph of the column load, that is control springs, and the spring force, that is the spring group, imposed above the first control spring graph with both shown as a function of the spring travel or compression distance.

Indicative of a railcar suspension and damping structure is spring group 36. The requisite dynamic operating response of spring group 36 for the above-noted 40000 pound tare weight railcar, not the outmoded 63000 pound tare weight railcar with the 286000 pound loaded weight capacity is shown in FIG. 7. The spring rate or response for an individual concentric spring arrangement, as well as the number of required springs of various arrangements needed in a specific spring group 36 will vary for a particular wheel-truck assembly 10 and style of railcar.

In FIG. 7, damping column load and spring force are plotted on the vertical axes as a function of spring travel in inches, which spring travel parameter is on the horizontal axis. Spring travel is the differential distance between a spring height at an unloaded condition, which becomes the zero or reference position, and the spring height at a compressed state from this reference height. The illustration of FIG. 7 is provided for load springs with a free height between 10 and 12.375 inches, and control springs with a free height between 9.5 and 12.5 inches. The spring height variation may depend upon coil rod diameter, spring diameter, rod material composition, material heat treatment, or a combination of these and other factors. FIG. 7 has two plots or graphs, which are illustrated together for ease of comparison of the operation of spring group 36. In the lower plot or curve 71, the force or load applied to the sideframe column through the friction shoe by the control springs 50 to 56 is shown as a function of the the spring travel distance. Similarly in the upper graph or curve 73, the spring forces or total load of the railcar are plotted as a function of the spring travel distance for the spring group.

In this overlayed graphical illustration, the spring forces can be compared for an equivalent spring travel distance for each of the control springs and load springs of the spring group. Further, it is possible to consider the forces required for an equivalent spring travel distance between the load springs 50 to 56 and spring group 36 as a whole. The force required to compress the control springs is significantly less than to displace the load springs an equivalent distance. It must be noted that the second or spring force plot 73 includes the displacement of control springs 50 to 56 in the overall displacement of spring group 36. Further, it appears that the origin in the plot for the control spring in the lower graph is displaced from its position, however, this is merely reflective of the fact that the free height of the control spring in the example is higher than the free height of the load springs within the spring group as a whole. This spring height is also explanatory of the fact that the values of compression appear as negative numbers, that is compression from a free height and not as positive displacement values, and this use of the negative is merely a mathematical convention and not a limitation.

For each plot in FIG. 7, the column load or damping forces, as a function of spring travel (compression), are noted as a first linear, or constant, function for spring travel less than two (2) inches. The slope of the curves 71, 73 in FIG. 7 rapidly increases after transition points 70 and 72 for the control springs 50–56, and spring group 36, respectively. The linear damping rate for a spring is the rate of change in compressive or stored force per unit of compressed spring distance. In FIG. 7, the linear damping rates for the line segments for the exemplary spring set include the following:

|  | CONDITION | LINEAR DAMPING RATES |
|---|---|---|
| (a) | Control spring column load during empty-car travel | 1538 lbs./in. |
| (b) | Control spring column load during loaded-car travel | 2923 lbs./in. |
| (c) | Spring group (load coils) during lightly-loaded car travel | 4444 lbs./in. |
| (d) | Spring group (load coils) during capacity-loaded car travel | 26667 lbs./in. |

The spring travel or displacement for a static or stationary railcar at an empty-car weight and first spring position is noted by line 74, which is vertical to the horizontal axis and intersects curves 71 and 73 at points 76 and 78, respectively. In this example, the static, that is non-moving, empty-car weight displaces the spring about one inch. A second static position is noted by second vertical line 80 for a railcar loaded to capacity, which line 80 intersects curves 71 and 73 at the second spring position located on the sloped portions of the curves at points 82 and 84, respectively. These several intersection points 76, 78, 82 and 84 are reference points or benchmarks for the relative spring displacements (spring force). The empty-car or first spring rate for the load springs is noted between points 87 and 72 on the upper graph of FIG. 7, and the loaded-car or second spring rate for the load springs is between point 72 and the noted solid spring position. However, the spring group spring rates are noticeably different, that is the loaded-car rate is about six times the linear spring rate for the empty car. The empty-car column load is seen at point 76 and the loaded-car column load is noted at point 82. The implication for the relationship between the individual inner and outer springs of the dual-rate control springs 50, 54 and 52, 56 is that the second or loaded-car linear spring rate is about twice the first or empty-car linear damping rate. However, the spring group (load coils) spring rates are noticeably different, that is the loaded-car rate is about six times the linear spring rate for the empty-car. The control springs in comparison to the load springs of the spring group are not directly related to or proportionate in their compressive capacity, but the defined rates in FIG. 7 clearly indicate the spring forces and the spring rates for the respective empty and loaded car conditions. The control springs provide a biasing force for the snubbers (friction shoes), which provide a damping force that cooperates with the spring group as a whole. The control springs assist the load springs.

Vertical lines 86 and 88 in FIG. 7 normally extend from the horizontal axis and are parallel to first static line 74. These lines 86, 88 define the bounds of empty-car spring displacement during all dynamic, that is railcar travel, modes. This is a recognition that a freight railcar will experience oscillations as it progresses along a rail track, which oscillations induce displacement of the individual springs within spring group 36. These oscillations are reflected by both the positive and negative displacement or travel, that is more or less compression, of the individual springs about the static, empty-car position depicted by vertical line 74 of FIG. 7. This range of spring travel is defined as the empty-car or first dynamic range of railcar travel. The spring travel range includes transition points 70 and 72, which are at spring travel distances less than the upper limit of spring travel for the empty-car dynamic range noted by vertical line or boundary 88. Similarly, lower and upper spring-travel limits or boundaries are provided on either side of capacity-loaded railcar static positions 82 and 84, which boundary limits 90 and 92 intersect each of curves 71,73 and define the second dynamic range therebetween over the second spring rate ranges for the railcar. The upper limit of a compressed spring for the second dynamic range, that is depicted by vertical line 92, is less than the mechanically solid state of a fully compressed coil spring height. This latter "solid" height for the springs is noted by vertical line 98 and is dictated as a standard by the AAR. This solid height value is invariable for the spring and car supplier, and each of the springs must be solid at the same height, as dictated by this AAR standard. Although the boundary values 86,88 and 90,92 for the dynamic ranges are shown as fixed limits, it is known that violent and unusual actions or exaggerated forces could expand the spring displacements beyond these ranges and would appear as a 'spike' on a force diagram. However, as a pragmatic matter, the above-defined spring-travel ranges will encompass operating ranges expected during operation of both empty and fully-loaded railcars.

Curves 71 and 73 in FIG. 7 are shown as straight line functions for the multiple-spring subassemblies, which are referred to as control springs and load springs, and have a first spring rate or slope in the first dynamic operating range. This first spring rate is the bias force provided by the first or longer springs 50,52 within the spring pairs 50,54 and 52,56. Thereafter, at transition points 70,72 the spring rate, or slope of curves 71,73 increases, and thus the rates of the damping load and spring group change. This is indicative of variable or dual-rate spring coils and provides the different spring rates requisite to accommodate the change in the operation of the newer, lightweight freight railcars with the increased carrying capacity. In the example of FIG. 7, the dynamic travel ranges for an empty-car state of both the control springs and the spring group are less than 2 inches of compression from the free-coil height. The dynamic travel range for the loaded-car state for both the control springs and the spring group is between about 2.5 inches to less than 5 inches of spring compression. The specific ranges, the static spring positions and the spring rates are dependent upon the specific characteristics of the springs, such as wire diameter, coil diameter, spring free-height and spring group configuration.

Figure 11:
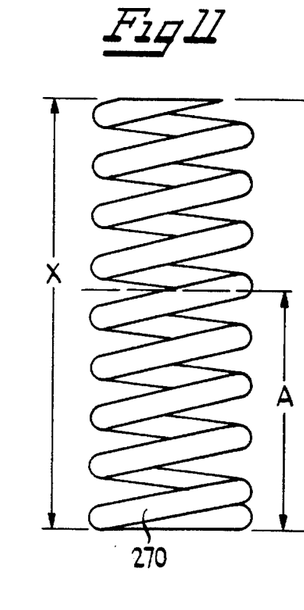
FIG. 11 is an exemplary spring at a spring free-height.
Figures 11A, 11B:
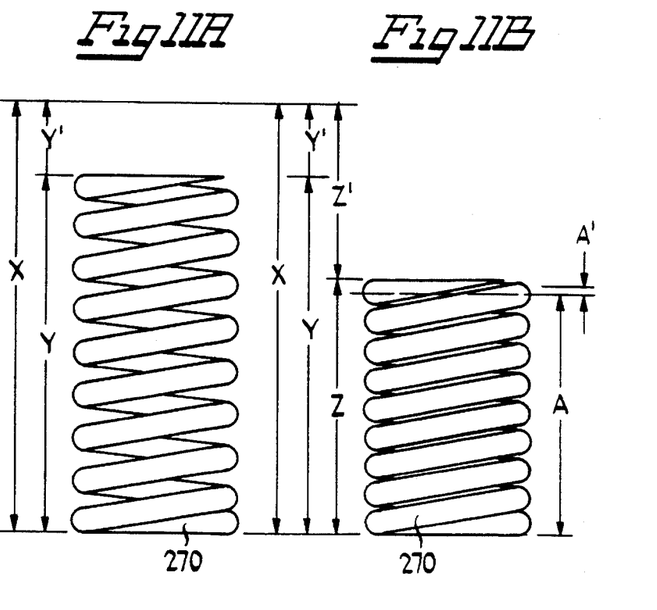

In FIG. 11, an exemplary spring 270 is illustrated with spring free-height x and fully compressed or mechanically solid height A. In FIG. 11A, spring 270 has been compressed a compression distance y' to a static empty-car spring height y, and in FIG. 11B, the loaded-to capacity car compresses spring 270 to spring height z with a compressed distance z'. In a dynamic operation the railcar will oscillate about the static heights, that is it will compress and expand the springs about these static heights. The noted distance A' is the reserve or safety distance designed into springs to accommodate any random car oscillatitons beyond normal expectations. It is recognized that the relative proportions in this figure do not reflect the spring heights shown in FIG. 7.

The structural and operational conflicts between decreased railcar weight and increased carrying capacity is a primary operating condition, which must be accommodated. Further complicating factors include the standards and specifications set by the AAR for railcars utilized in interchange, that is railcars not dedicated to a single user, which thus fall under the aegis of the AAR. The constraining weight factors lead to the operational constraints for the designer. Although the user wishes to maximize railcar carrying capacity while minimizing railcar weight, safe operational characteristics are a prime concern of both the railcar supplier and user.

Figure 8:
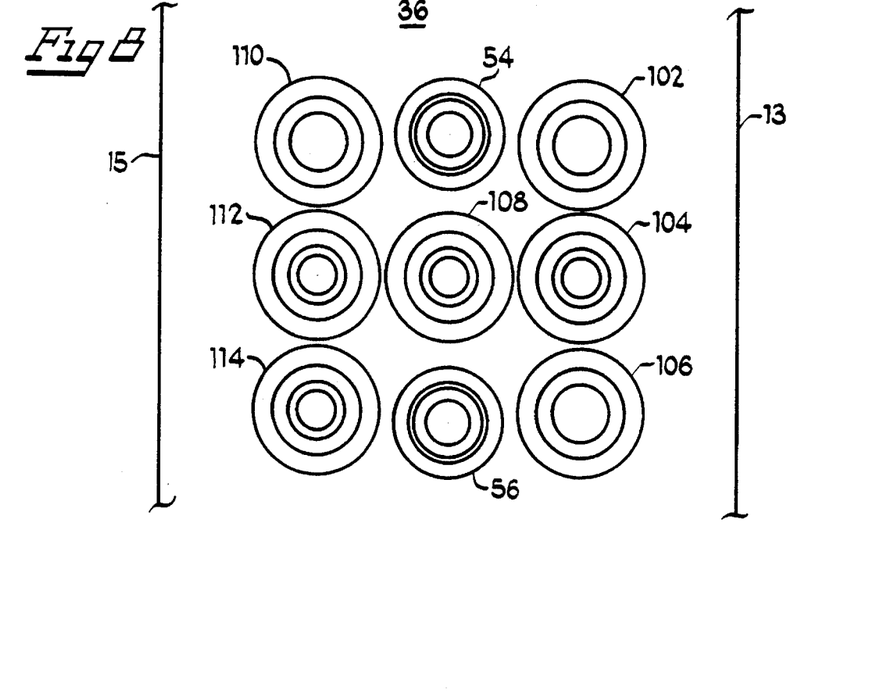
FIG. 8 is a plan view of a spring group configuration of the preferred embodiment.

FIG. 8 is a plan view of a specific spring group 36, which fulfills the operating demands for a lightweight, that is a 40000 pound tare weight, railcar and provides the operating characteristics indicated in FIG. 7. This three by three matrix spring configuration has load springs on the noted outer face 13 of sideframe 12, which springs are specifically noted as load springs 102, 104 and 106. Load springs 102 and 106 are two-spring subassemblies, while load spring 104 is a three-spring subassembly. Control springs 54 and 56 are, as noted above, each two-spring subassemblies. Centrally positioned load spring 108 is a two-spring subassembly. Along sideframe inner face 15, central load spring 112 is a subassembly of two springs, while load springs 110 and 114 are three-spring subassemblies. This particular arrangement with the proper coil diameter, spring rod diameter, spring material, and spring height has been found to provide the operational response required to meet the illustrated requisites of FIG. 7 for at least one end of one railcar. Although the above discussion particularly teaches a multispring arrangement for each of the several load and control springs, it is possible to utilize a single coil variable rate spring for some of the load springs to attain the desired force or load response.

As noted above dual rate load spring groups are well known in the art. However, dual rate control springs creating a dual rate column load with reduced column load for an empty car are shown in the present instance and noted in the graphical illustrations of FIG. 7. The designs of spring groups provide their dynamic operating ranges within the spring-group operating range for either the empty or the loaded car.

This structural arrangement of FIGS. 7 and 8 is not the only spring configuration or arrangement available, but it fulfills the operating and structural requirements of the AAR, and the dimensional constraints of sideframe windows 18. The operating response or characteristic of any spring coil is considered to be a limitation of the coil material, its heat treatment, the diameter of the rod or wire used to make the spring and the length or height of the spring. Therefore, it is considered that it would be conceivable to prepare a spring group 36 of a different configuration and having a different number of springs of different diameter, which spring group would be operable to meet the specification constraints to satisfy the performance requirements. However, this different configuration must fulfill the AAR and manufacturer requirements.

Those skilled in the art will recognize that certain variations can be made in this illustrative embodiment. While only specific embodiments of the invention have been described and shown, it is apparent that various alternatives and modifications can be made thereto. It is, therefore, the intention in the appended claims to cover all such modifications and alternatives as may fall within the true scope of the invention.

We claim:

1. In a wheel truck assembly for a lightweight, high-load capacity, railroad freight railcar having an empty-car weight, a rated-lading-capacity railcar weight, a longitudinal axis and, at least two wheel and axle subassemblies, each said truck assembly having a bolster with a first end, a second end, a forward edge and a rearward edge, a first sideframe and a second sideframe, each said first and second sideframe having an inboard side, an outboard side, a generally centrally located window with a platform, said first and second sideframes approximately parallel to said railcar longitudinal axis, a plurality of friction shoes, each said friction shoe having a lower wall, a first pair of said friction shoes positioned at one of said bolster first and second ends, and a second pair of said friction shoes positioned at the other of said first and second bolster ends, one of said friction shoes of each of said first and second pair of friction shoes positioned at the forward edge of said bolster and the other of said first and second pairs of friction shoes positioned at the rearward edge of said bolster, and a suspension system for each said first and second sideframe, each said suspension system comprising;

a plurality of first control springs, second control springs and load springs, each said first control spring operable over a range of first compression distances between an unloaded and expanded state, and a fully compressed and mechanically solid state, each said second control spring operable over a range of second compression distances between an unloaded and expanded state, and a fully compressed and mechanically solid state, each said load spring operable over a range of load-spring compression distances between an unloaded and expanded state, and a fully compressed and mechanically solid state, a plurality of control spring subassemblies, each said control spring subassembly having at least one of said first control springs and second control springs arranged for serial operation, a plurality of first load spring subassemblies and second load spring subassemblies, each of said first and second load spring subassemblies having at least one of said load springs, which load springs are serially operable within each said first and second load spring subassembly, a plurality of spring groups, each said spring group having a plurality of control spring subassemblies, at least one of said first load spring subassemblies and at least one of said second load spring subassemblies, one of said spring groups positioned and operable at each said sideframe between said bolster end and said sideframe platform, each said spring group being a variable damping arrangement providing a first spring-group linear damping rate for said railcar at an empty-car condition and a second spring-group linear damping rate for said railcar at rated-lading-capacity railcar condition;

each control spring subassembly in each said spring group positioned and compressible between a friction-shoe and a respective sideframe platform;

each said first and second control spring subassembly and said spring group having a first static compressed spring height at an empty car weight, and a second static compressed spring height at said rated-lading-capacity railcar weight, said second static compressed spring height less than said first static compressed spring height for each of said control spring subassemblies and said spring group;

a control spring subassembly and spring group spring-height reference position defined at about said spring unloaded and expanded state for said control spring subassemblies and said spring group;

each said control-spring subassembly having a column-load first dynamic spring-rate operating range with an essentially linearly increasing spring compressive force defined over a first set of spring compression distances from about said reference position height to a first dynamic compressed spring height less than said reference height for each said control spring subassembly, wherein said first static compressed height is about equidistant between said reference position height and said first dynamic compressed spring height in said first dynamic spring-rate operating range, and a column-load second dynamic spring-rate operating range with an essentially linearly increasing spring compressive force defined over a second set of spring compression distances from a second dynamic compressed height less than said first dynamic compressed height and a third dynamic compressed height less than said second dynamic compressed height and having said second static compressed height about equidistant between said second dynamic compressed height and said third dynamic compressed height;

each said spring group having a load-force first dynamic spring-rate operating range with an essentially linearly increasing spring compressive force defined over a third set of spring compression distances from about said reference position height to a fourth dynamic compressed spring height less than said reference position height, said fourth spring height about equal to said first dynamic spring height, wherein said first static compressed height is about equidistant between said reference position height and said fourth dynamic compressed height, and a load-force second dynamic spring-rate operating range with an essentially linearly increasing spring compressive force defined over a fourth set of spring compression distances from a fifth dynamic compressed spring height, which is about equal to said second compressed spring height and less than said fourth dynamic compressed spring height, to a sixth dynamic compressed spring height about equal to said third dynamic compressed height and less than said fifth dynamic compressed spring height, said second static compressed height about equidistant between said fifth dynamic compressed height and said sixth dynamic compressed height;

each said control spring subassembly column-load first dynamic spring-rate linear compressive force defining a first linear damping rate for said empty-car condition and said column-load second dynamic spring-rate linear compressive force defining a second linear damping rate for said rated-laden-capacity railcar condition, each said spring-group load-force first dynamic spring-rate linear compressive force defining a third linear damping rate for said empty-car condition and said load-force second dynamic spring-rate linear compressive force defining a fourth linear damping rate for said rated-laden-capacity railcar condition;

said control-spring first linear damping rate for said control spring subassembly changing to said second linear damping rate to define a first transition point, and said spring-group, third linear damping rate changing to said spring group, fourth linear damping rate to define a second transition point, said column-load and said load-force first dynamic operating range including said first and second transition points along said first and third linear damping rates, which springs and spring damping rates are selected to provide dual-rate control springs in cooperation with dual-rate load springs in said spring-group to accommodate all rail track conditions and to provide empty-car snubbing forces at spring compression distances less than said first and second transition points for said control spring subassemblies and said spring groups.

2. In a wheel truck assembly for a railcar as claimed in claim 1 wherein each of said control springs is a coil spring with a first end, a second end and a central passage, each said control spring operable with and contacting a friction shoe at a lower wall, said control spring provided in an upright array to maintain said control-spring subassembly in aligned contact with said friction shoe.

3. In a wheel truck assembly for a railcar as claimed in claim 1 wherein each said spring group is a three by three matrix array having a first control spring subassembly and a second control spring subassembly, and having at least one of a first load spring subassembly and a second load spring subassembly, said first and second control spring subassemblies and first and second load spring subassemblies provided in said array to minimize railcar rocking.

4. In a wheel truck assembly for a railcar as claimed in claim 3 wherein said first and second load spring subassemblies have at least a first load spring and a second load spring, which first and second load springs are concentrically arranged and serially operable.

5. In a wheel truck assembly for a railcar as claimed in claim 1 wherein said first load spring subassembly has a first load spring and a second load spring concentrically arranged and serially operable to provide said first and second linear damping rates.

6. In a wheel truck assembly for a railcar as claimed in claim 5 wherein at least one of said load spring subassemblies has a first and second load spring and further comprises a third load spring concentrically arranged with said first and second load springs therein to provide a further biasing force against compression of said spring group.

7. In a wheel truck assembly for a railcar as claimed in claim 6, wherein said first and second control springs in each said control spring subassembly and, said first and second load springs in each said load spring subassembly are compressible to the same fully compressed and mechanically solid height.

8. In a wheel truck assembly for a railcar as claimed in claim 7, wherein said control spring subassemblies and, said first and second load spring subassemblies are compressible to a said sixth dynamic compressed spring height in said second dynamic operating range, which sixth dynamic compressed spring height is greater than said fully compressed and mechanically solid spring height.

9. In a wheel truck assembly for a railcar as claimed in claim 2, wherein each said first and second control subassembly has an outer control spring with a first unloaded and expanded height and an inner control spring of a second unloaded and expanded height, which inner and outer springs are concentrically arranged, said second unloaded and expanded height being greater than said first unloaded and expanded height.

10. In a wheel truck assembly for a railcar as claimed in claim 3 wherein each said control spring subassembly has an outer control spring of a first unloaded and expanded height and, a second and inner control spring with a second unloaded and expanded height less than said first unloaded and expanded height;

said control spring subassembly positioned between said platform and friction-shoe lower wall for each said friction shoe, said first and second control spring subassemblies for said bolster forward and rearward edge friction shoes being longitudinally aligned in each said spring group on each said sideframe platform, said outer and inner control springs of each said control spring subassembly concentrically arranged and serially operable to bias said associated friction shoe for damping motion and vibration of said truck assembly;

a plurality of first and second load spring subassemblies, each said first load spring subassembly having an outer load spring with a third unloaded and expanded height, and an inner load spring with a fourth and higher unloaded and expanded height, said inner and outer load springs concentrically arranged and serially operable between said platform and said associated one of said bolster first and second ends, a first load spring first subassembly centrally positioned in said three by three matrix of spring subassemblies between said aligned first and second control spring subassemblies, a second load spring first subassembly positioned adjacent one of said first and second said control spring subassemblies at said sideframe outboard side, a third load spring first subassembly positioned adjacent the other of said first and second control spring subassemblies at said sideframe outboard side, a plurality of third load springs, each said second load spring subassembly having at least one of said first load spring subassemblies further including a third, load spring concentrically positioned in said first load spring subassembly, which third load spring has an expanded and unloaded reference height equal to the reference position height of the outer of said first and second load springs of said at least one load spring subassembly, a first one of said load spring second subassemblies positioned between said first and second load spring first subassemblies at said sideframe outboard side, a second load spring second subassembly positioned adjacent one of said first control spring subassemblies at said sideframe inboard side and a third load spring second subassembly positioned adjacent the other of said first control spring subassemblies at said sideframe inboard side;

a fourth load spring first subassembly positioned between said second and third load spring second subassembly longitudinally along said sideframe inboard side;

one of said spring groups provided at each bolster end of each truck assembly of said railcar to minimize vibration, warpage, truck hunting, car rock and roll, and to maintain stability of said railcar during travel at any of railcar-empty and railcar-loaded conditions.

11. In a wheel truck assembly for a freight railcar as claimed in claim 1 wherein said spring group has a plurality of upright control spring subassemblies and load spring subassemblies, each said control spring and load spring subassembly having at least one spring, an empirically determinable combination of said control and load spring subassemblies arranged in a matrix array between said platform and said bolster end for each associated sideframe platform and bolster end for a car weight and design, which spring groups are operable to bias said antifriction pads and truck assembly to inhibit truck rock and roll, and truck hunting.

12. In a wheel truck assembly as claimed in claim 11 wherein each said load spring has an unloaded and expanded height between about 10 inches and 12 inches.

13. In a wheel truck assembly as claimed in claim 11 wherein each said control spring has an unloaded and expanded height between about 9.5 inches and 12.5 inches.

14. In a wheel truck assembly as claimed in claim 12 wherein said load springs have a first linear spring rate, a second linear spring rate and a transition point therebetween, said second linear rate above said transition point being approximately twice as large as said first linear spring rate.

15. In a wheel truck assembly as claimed in claim 14 wherein said spring group has a third linear spring rate, a fourth linear spring rate and a second transition point therebetween, said fourth linear spring rate above said second transition point being at least five times as great as said third linear spring rate.

* * * * *